(12) United States Patent
Fitton

(10) Patent No.: US 8,156,171 B1
(45) Date of Patent: Apr. 10, 2012

(54) DIGITAL LOGIC CIRCUIT

(75) Inventor: Michael Fitton, London (GB)

(73) Assignee: Altera Corporation, San Jose, CA (US)

( * ) Notice: Subject to any disclaimer, the term of this patent is extended or adjusted under 35 U.S.C. 154(b) by 1176 days.

(21) Appl. No.: 11/942,881

(22) Filed: Nov. 20, 2007

(51) Int. Cl.
*G06F 7/38* (2006.01)
(52) U.S. Cl. ........................................ 708/605; 708/500
(58) Field of Classification Search .................. 708/500, 708/502, 605
See application file for complete search history.

(56) References Cited

U.S. PATENT DOCUMENTS

| | | | |
|---|---|---|---|
| 5,956,263 A * | 9/1999 | Narita et al. .................. | 708/525 |
| 6,175,911 B1 * | 1/2001 | Oberman et al. ............. | 712/221 |
| 6,487,575 B1 * | 11/2002 | Oberman ...................... | 708/504 |
| 7,599,980 B1 * | 10/2009 | Rarick .......................... | 708/605 |
| 2002/0116431 A1 * | 8/2002 | Ho et al. ....................... | 708/502 |
| 2006/0184602 A1 * | 8/2006 | Lutz et al. .................... | 708/502 |

* cited by examiner

*Primary Examiner* — Chuong D Ngo
(74) *Attorney, Agent, or Firm* — Ropes & Gray LLP; Jeffrey H. Ingerman

(57) ABSTRACT

In one aspect, there is provided a digital logic circuit that comprises circuitry for generating a new iteration $x_{n+1}$ of the reciprocal square root of A from the previous iteration $x_n$ by (i) multiplying the previous iteration $x_n$ by the number A; (ii) multiplying the result of (i) by the previous iteration $x_n$; (iii) subtracting the result of (ii) from 3; and (iv) multiplying the result of (iii) by half of the previous iteration $x_n$. According to another aspect there is provided a calculator unit for determining an initial value for use in a iterative process for calculating an estimate of the reciprocal square root of a number A, the calculator unit comprising circuitry for (a) rounding the number A to the nearest number of the form $2^J$, where J is an integer; (b) if J is odd, rounding J up to the nearest even number to give J'; (c) if J is even, setting J to J'; and (d) calculating $2^{-(J'/2)}$ to determine the initial value for the reciprocal square root of A.

8 Claims, 6 Drawing Sheets

```
int int_recip_sqrt(float A)
{
        float t_new, t;
        int i;                                          //this is the counter
        int num_it=NUM_SQRT_ITERATIONS; //e.g. set to 8
        long int mult_res;

//initialise value
        t = start_value(A)

//start calculation
        for (i=0;i<num_it;i++)
                t = t/2*(3-A*t*t)
}
```

Figure 1

|         |         | Largest | Smallest |
|---------|---------|---------|----------|
| Input A | QW.Y    | $2^W$   | $2^{-Y}$ |
| 1/A     | QY.W    | $2^Y$   | $2^{-W}$ |
| $1/\sqrt{A}$ | Q(Y/2).V | $2^{Y/2}$ | $2^{-V}$ |

Figure 2

|           | 1              | 2              |
|-----------|----------------|----------------|
| $t_1$     | $x_n.x_n$      | $A.x_n$        |
| $t_2$     | $A.t_1$        | $x_n.t_1$      |
| $t_3$     | $3-t_2$        | $3-t_2$        |
| $x_{n+1}$ | $\frac{x_n}{2}.t_3$ | $\frac{x_n}{2}.t_3$ |

Figure 3

```
//definition of number format
#define INT_BITS        6
#define FRAC_BITS   26              //e.g. input is Q6.26 here
define NUM_BITS        (INT_BITS+FRAC_BITS)    //32 in this example define SQRT_INT_BITS (FRAC_BITS/2)              //13 here
define SQRT_FRAC_BITS (NUM_BITS-SQRT_INT_BITS)     //e.g. output is Q13.19 int int_recip_sqrt_fl(int a, int *lut)
{
        unsigned__int64 t_new, t;
        int three = 3<<SQRT_FRAC_BITS;
        int i;
        int num_it=NUM_SQRT_ITERATIONS;

//initialise value
        t = start_value(a)

for (i=0; i<num_it;i++)
        {

//do a*t first as less likely to overflow.  However, more (small) errors are observed
//output is Q INT_BITS.FRAC_BITS, see footnote
                t_new = uint64_DSP_multiplier_shift(t,a,SQRT_FRAC_BITS);

//output is Q SQRT_INT_BITS.SQRT_FRAC_BITS
                t_new = uint64_DSP_multiplier_shift(sqrt,t_new,FRAC_BITS);

//output is Q SQRT_INT_BITS.SQRT_FRAC_BITS
                t_new = three – t_new;

//output is Q SQRT_INT_BITS.SQRT_FRAC_BITS
//shifting by SQRT_FRAC_BITS + 1 also gives T>>1
                t = uint64_DSP_multiplier_shift(t,t_new, SQRT_FRAC_BITS+1);
        }
        return (int) t;

| Input Value, A (Q2.6) | Binary Value | Z | J | J' | Estimated Initial Value $x_0$ | Actual Result | Error |
|---|---|---|---|---|---|---|---|
| 0.2 | 00001100 | 4 | -3 | -2 | 2.0000 | 2.2361 | 0.2361 |
| 0.25 | 00010000 | 3 | -2 | -2 | 2.0000 | 2.0000 | 0.0000 |
| 0.45 | 00011100 | 3 | -2 | -2 | 2.0000 | 1.4907 | 0.5093 |
| 0.75 | 00110000 | 2 | -1 | 0 | 1.0000 | 1.1547 | 0.1547 |
| 1.1 | 01000110 | 1 | 0 | 0 | 1.0000 | 0.9535 | 0.0465 |
| 1.9 | 01111001 | 1 | 0 | 0 | 1.0000 | 0.7255 | 0.2745 |
| 2.1 | 10000110 | 0 | 1 | 2 | 0.5000 | 0.6901 | 0.1901 |
| 3 | 11000000 | 0 | 1 | 2 | 0.5000 | 0.5774 | 0.0774 |

Figure 6

# DIGITAL LOGIC CIRCUIT

TECHNICAL FIELD OF THE INVENTION

The invention relates to a digital logic circuit, and in particular relates to a digital logic circuit that can be used to efficiently calculate the reciprocal square root of a given value.

BACKGROUND TO THE INVENTION

There are many known methods or techniques used to calculate the reciprocal square root of a given value, A. For completeness, the reciprocal square root of A is written $$x = \frac{1}{\sqrt{A}} \quad (1)$$

One of these methods applies Newton's method to the equation $$\frac{1}{x^2} - A = 0 \quad (2)$$

After a final iteration, x will be approximately equal to the reciprocal square root of A.

According to the Newton method, in each iteration the following expression is evaluated $$x_{n+1} = \frac{x_n}{2}(3 - Ax_n^2) \quad (3)$$

After the final iteration has been completed, the square root of A can be calculated, if required, by multiplying the result by A.

FIG. 1 shows how the iterative method in equation (3) is implemented in C code for floating point numbers.

However, the conventional techniques used to implement this method in a digital logic circuit are relatively inefficient.

SUMMARY OF THE INVENTION

According to a first aspect of the invention, there is provided a digital logic circuit for calculating an estimate of the reciprocal square root of a number A using an iterative process, the digital logic circuit comprising circuitry for setting the value of A to have a fixed-point number format QW.Y, where W and Y are positive integers; and circuitry for setting the output value of the iterative process, the estimate of the reciprocal square root of the number A, to have the fixed-point number format Q(Y/2).(W+Y/2).

According to a second aspect of the invention, there is provided a digital logic circuit for calculating an estimate of the reciprocal square root of a number A using an iterative process, the digital logic circuit comprising circuitry for generating a new iteration $x_{n+1}$ of the reciprocal square root of A from the previous iteration $x_n$ by (i) multiplying the previous iteration $x_n$ by the number A; (ii) multiplying the result of (i) by the previous iteration $x_n$; (iii) subtracting the result of (ii) from 3; and (iv) multiplying the result of (iii) by half of the previous iteration $x_n$.

According to a third aspect of the invention, there is provided a calculator unit for determining an initial value for use in a iterative process for calculating an estimate of the reciprocal square root of a number A, the calculator unit comprising circuitry for (a) rounding the number A to the nearest number of the form $2^J$, where J is an integer; (b) if J is odd, rounding J up to the nearest even number to give J'; (c) if J is even, setting J to J'; and (d) calculating $2^{-(J'/2)}$ to determine the initial value for the reciprocal square root of A.

According to a fourth aspect of the invention, there is provided a digital logic circuit comprising circuitry for determining when to stop an iterative process used to calculate an estimate of the reciprocal square root of a number A, the circuitry determining the result of $A.(x_n)^2$, where $x_n$ is the value of the current iteration; and stopping the iterative process if the result is sufficiently close to 1.

According to a fifth aspect of the invention, there is provided a method of calculating an estimate of the reciprocal square root of a number A using an iterative process, the method comprising setting the value of A to have a fixed-point number format QW.Y, where W and Y are positive integers; and setting the output value of the iterative process, the estimate of the reciprocal square root of the number A, to have the fixed-point number format Q(Y/2).(W+Y/2).

BRIEF DESCRIPTION OF THE DRAWINGS

The invention will now be described, by way of example only, with reference to the following drawings, in which:

FIG. 1 shows the implementation of Newton's method to the derivation of a reciprocal square root in C code;

FIG. 2 is a table that shows the largest and smallest values that can be represented at various stages of the calculation to determine the reciprocal square root of A;

FIG. 3 is a table that compares a prior art method (column 1) and a preferred method (column 2);

FIG. 4 shows the implementation of a preferred method to determine the reciprocal square root of A in C code;

FIG. 6 is a table that demonstrates the effectiveness of the preferred method of calculating the initial value shown in FIG. 5.

DETAILED DESCRIPTION OF THE PREFERRED EMBODIMENTS

Figure 5:
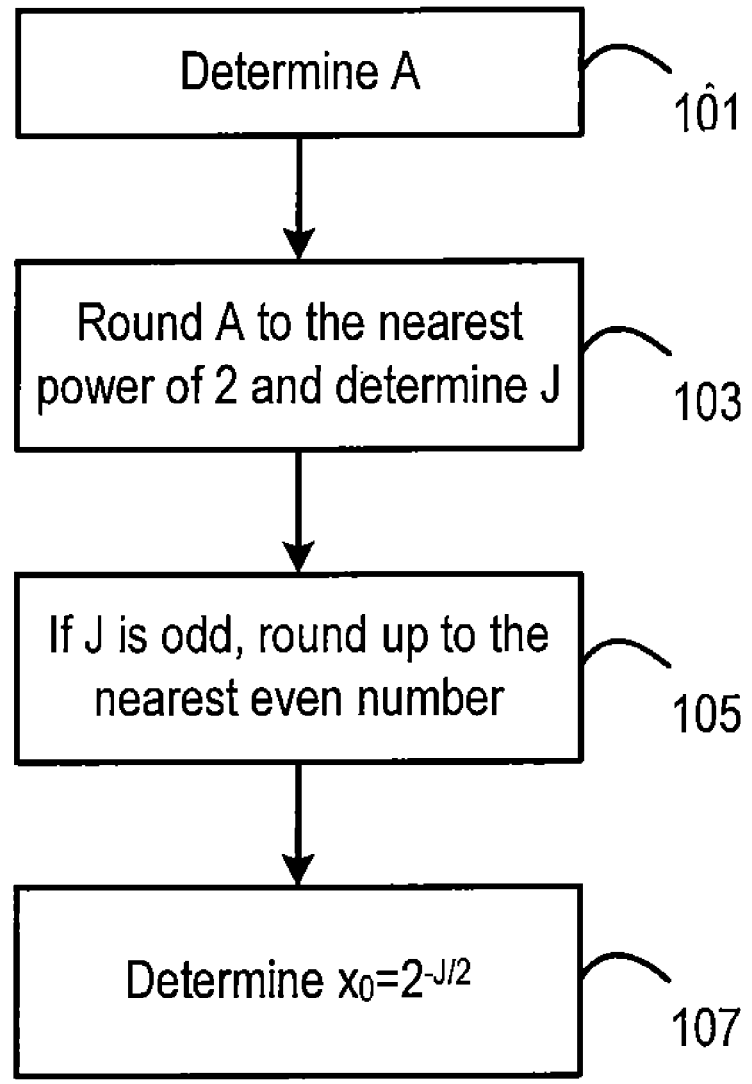
FIG. 5 is a flow chart showing a method of determining an initial value for the method in FIG. 4.

The invention relates to four areas in which the prior art methods of calculating reciprocal square roots have been improved.

The first area to be described will be the derivation of the number format used to represent the output of the iterative method.

Assume that the numbers are represented in the standard fixed-point number format QW.Y, where W is the number of integer bits (for example 6) and Y is the number of fractional bits (for example 26). Thus, the largest number that can be represented is $2^W$ for an unsigned number, and the smallest number that can be represented is $2^{-Y}$. The table in FIG. 2 shows the largest and smallest numbers that can be represented at each stage of a calculation to determine the reciprocal square root of A. In the table, the parameter V denotes that the number of fractional bits are implementation specific and need to be set to provide sufficient accuracy.

In order to ensure that the number does not overflow (the largest number is $2^{Y/2}$), as well as providing the maximum possible resolution without any increase in the total number of bits in the calculation, in one embodiment of the invention, V is set to W+Y/2, which means that the output format is Q(Y/2).(W+Y/2).

So, if the input format is Q6.26 described above, then the output format will be Q13.19.

If the square root of A is desired instead of the reciprocal square root of A, the number format for $$A \cdot \frac{1}{\sqrt{A}} \quad (4)$$

will be Q(6+13).(26+19) which is Q19.45.

To restore the original number format, the number needs to be shifted to the right by W+Y/2 bits, and the top Y/2 bits need to be truncated. This gives (Q19.45)>>(19)=Q19.26 trunc(Q19.26)=Q6.45

Although this involves truncating the integer bits, there is no chance of overflow, as the square root of a number that has the format QW.Y is Q(W/2).V.

The second area in which the invention improves over the prior art is in the order in which the elements in equation (3) are carried out by a multiplier block. FIG. 3 shows a table that compares one way of implementing the method in equation (3) (shown in column 1) and a preferred method (shown in column 2). Thus, it can be seen that in the alternative method, the first stage is to square the current value, $x_n$, and then to multiply this value by A in the second stage. However, the number format of the output of the first stage would be Q(Y.W) (since the square of the current value, $x_n$, would be approximately equal to the reciprocal of A) to avoid overflow, while the output format for the second and subsequent stages would be in the format Q(Y/2).(W+Y/2).

In contrast, in the preferred method, (column 2), the current value $x_n$, is multiplied by A in the first stage, the resulting value is multiplied by $x_n$ in the second stage, the result of the second stage is subtracted from 3 in the third stage, and the in the fourth stage, the value of the next iteration, $x_{n+1}$, is determined by multiplying the output of the third stage by the current value, $x_n$, and dividing by 2. The consequence of the preferred order of the first and second stages means that the output of the first stage has the number format QW.Y (since this stage is nearly the equivalent of the square root of A). Again, the output of the second and subsequent stages would be in the format Q(Y/2).(W+Y/2).

FIG. 4 shows the implementation of a preferred method to determine the reciprocal square root of A in C code, as well as showing how a 32×32 bit multiplier is used and shifted to give the correct result.

Thus, at lines 2 and 3, the number of integer and fractional bits in the input are set, and at lines 6 and 7 the number of integer and fractional bits in the reciprocal square root are determined.

In line 14, the number of iterations to find the reciprocal square root is defined, and at line 17, the initial value ("start_value(a)") is defined. In lines 22-35, the method shown in column 2 of the table in FIG. 3 is set out. In the code, "uint64_DSP_multiplier_shift(t,a,SQRT_FRAC_BITS)" is defined as the multiplication of "t" and "a", with the result being shifted by a value equal to "SQRT_FRAC_BITS".

The third area in which the invention improves over the prior art is in the initialisation or selection of the initial value ("start_value(a)"). Conventionally, a look-up table can be used to determine an appropriate initial value for a given value of A.

However, it has been recognised that it is relatively simple to calculate the square root, or the reciprocal square root, of a number that is a power of 2. Therefore, a method of determining an initial value that takes advantage of this is shown in FIG. 5.

Thus, in step 101, the value of A is determined. In step 103, A is rounded to the nearest number that is a power of 2. This can be given by $2^J$ where $W \leq J \leq (-Y)$. This can be implemented as a leading-zero detect circuit, which uses the position of the first "1" bit to determine the number of leading zeroes (Z). Therefore, J will be equal to W−Z−1 for unsigned numbers.

In step 105, if J is an odd number, the value of J is rounded up to the nearest even number to give J'. If J is an even number, J=J'.

In step 107, the initial value for the iteration, $x_0$, is determined from $x_0 = 2^{-J'/2}$. Therefore, as J' is even, the calculation of the initial value, $x_0$, will comprise determining the reciprocal of a power of 2 (since $2^{-J'/2} = 2^{-K} = \frac{1}{2}^K$, where K is an integer).

This approach to determining the initial value is more efficient in terms of memory than a look-up table, and is well suited to implementation in a field programmable gate array (FPGA) architecture.

FIG. 6 is a table that shows how efficient the method in FIG. 5 is at determining an initial value for a selection of unsigned numbers having the format Q2.6. For each of the input values A, the corresponding binary value is given, the values of Z, J and J' are determined, and the estimated initial value $x_0$ is calculated. The actual reciprocal square root of each of the input values is provided, and the error between this and the estimated initial value is provided.

It is possible to improve the overall accuracy of the estimated initial value by multiplying the result by $1/\sqrt{2}$ (≈0.707) if the value of J was odd (this compensates for rounding J to the nearest even value in step 105). However, including this step increases the complexity.

The final improvement over the prior art methods is to terminate the iterative process early if it determined that the currently determined value of the reciprocal square root of A is within an acceptable amount of the correct value. This can be determined by examining the value of $t_2$ from the second step of the preferred method in FIG. 3. In particular, $t_2 = A.x_n.x_n$, which, as $x_n$ tends to the reciprocal square root of A, will result in $t_2$ tending to 1. Therefore, the value of $t_2$ is monitored during the iterative process, and when it reaches an acceptable value (say ±1%=0.99 to 1.01), the process can be terminated, even if there are some iterations left to perform. By terminating the process early, the latency in calculating the reciprocal square root of A can be reduced.

An additional advantage of the proposed method is that the output of $t_1$ ($t_1 = A.x_n$) gives the square root of the current estimate ($x_n$). This will be less accurate than explicitly calculating the square root of the output ($x_{n+1}$), but is provided without any additional calculation.

Figure 7:
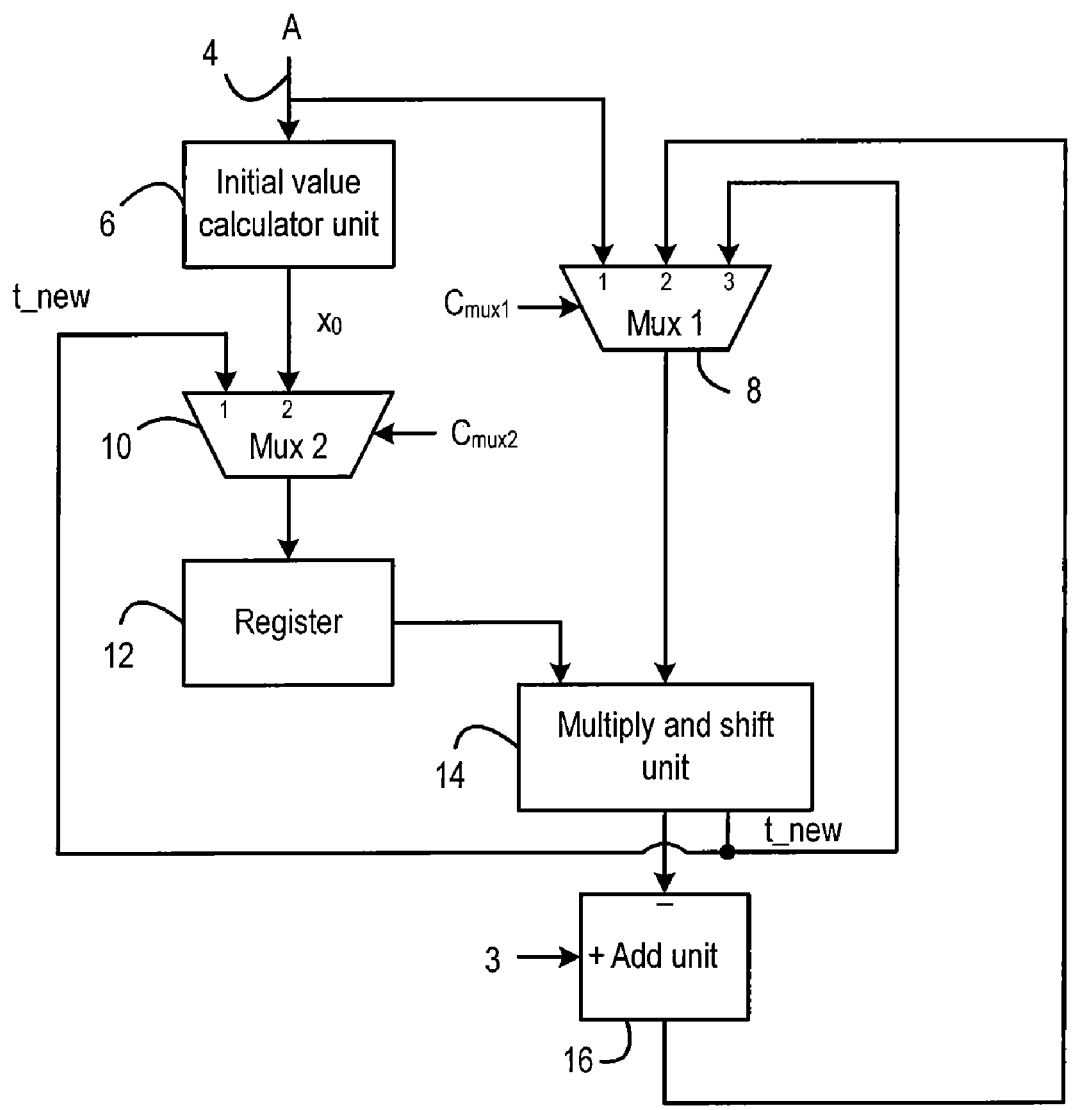
FIG. 7 is a block diagram of a digital logic circuit in accordance with an aspect of the invention.

FIG. 7 shows a digital logic circuit in accordance with an aspect of the invention that implements the method of calculating a reciprocal square root as described above.

It will be appreciated that although the digital logic circuit is shown as comprising various separate components, the digital logic circuit can be implemented in a single component such as a processor or a field-programmable gate array (FPGA) device.

The digital logic circuit 2 comprises an input 4 for receiving the value A for which the reciprocal square root is to be calculated. The input 4 is connected to an initial value calculator unit 6 and an input of a first multiplexer 8. The first multiplexer 8 has three data inputs and is controlled by a signal $C_{mux1}$.

The initial value calculator unit 6 comprises circuitry for determining an initial value for the reciprocal square root of A as described above. Namely, the unit 6 performs the method as described with reference to FIG. 5 to produce an initial value $x_0$. This initial value $x_0$ is provided to a second multiplexer 10. The second multiplexer 10 has two data inputs and is controlled by a signal $C_{mux2}$.

The output of the second multiplexer 10 is stored in a register 12, and the value in the register 12 is provided to a multiply and shift unit 14, along with the output value of the first multiplexer 8. The multiply and shift unit 14 multiplies two values together to produce an output which is provided to an add unit 16.

In this implementation, the add unit 16 subtracts the output of the multiply and shift unit 14 from 3, and provides the resulting value to one of the inputs of the first multiplexer 8.

The output of the multiply and shift unit 14 is also provided to an input of the both the first multiplexer 8 and second multiplexer 10.

Thus, after initialising the digital logic circuit 2 (i.e. including resetting the register 12), the digital logic circuit 2 receives a value A for which the reciprocal square root is to be calculated, and the initial value calculator unit 6 determines an initial estimate of the reciprocal square root $x_0$ using the method as described with reference to FIG. 5.

Once this initial value $x_0$ has been determined, it is passed to the second multiplexer 10, which is controlled by the control signal $C_{mux2}$ to output $x_0$ to the register 12 where it is stored.

Using the initial value $x_0$, the digital logic circuit 2 now determines the first iteration of the reciprocal square root of A in accordance with the method shown in FIG. 3. To do this, the register 12 outputs the stored value $x_0$ to the multiply and shift unit 14, and the first multiplexer 8 is controlled by $C_{mux1}$ to output the value A to the multiply and shift unit 14.

The multiply and shift unit 14 calculates the value of "$t_1$" shown in column 2 of the table in FIG. 3 by multiplying these two values together. The unit 14 outputs "$t_1$" (shown as t_new in FIG. 7) to the first and second multiplexers 8, 10.

The first multiplexer 8 is then controlled by $C_{mux1}$ to output the value of t_new to the multiply and shift unit 14. However, the second multiplexer 10 is controlled by $C_{mux2}$ to maintain the output of the initial value $x_0$ to the register 12 where it is stored and output to the multiply and shift unit 14.

The multiply and shift unit 14 then calculates the value of "$t_2$" shown in column 2 of the table in FIG. 3 by multiplying $x_0$ and t_new together. The unit 14 outputs "$t_2$" (shown as t_new in FIG. 7) to the add unit 16.

The add unit 16 calculates the value of "$t_3$" as shown in column 2 of FIG. 3 by subtracting the value of t_new from 3. The resulting value is provided to the first multiplexer 8, which is controlled by $C_{mux1}$ to output this value to the multiply and shift unit 14.

The multiply and shift unit 14 then calculates the first iteration of the reciprocal square root of A $x_1$ as shown in column 2 of the table in FIG. 3 by multiplying together the output of the first multiplexer 8, the output of the register 12 and a half (½). The resulting value (again shown as t_new) is provided to the first and second multiplexers 8, 10.

The second multiplexer 10 is controlled by $C_{mux2}$ to output the value of t_new ($x_1$) to the register 12, where it is stored.

The procedure can then repeat to determine $x_2$, $x_3$, and so on.

It will be appreciated that the digital logic circuit 2 will comprise some control circuitry (not shown) for generating the multiplexer control signals $C_{mux1}$ and $C_{mux2}$ and for initialising the calculator unit 6, register 12, multiply and shift unit 14 and add unit 16.

There is therefore provided a method and digital logic circuit that can be used to efficiently calculate the reciprocal square root of a given value.

The invention claimed is:

1. A digital logic circuit for calculating an estimate of reciprocal square root of an input value, said digital logic circuit comprising:
   a calculator unit for calculating an initial value from the input value, said calculator unit comprising:
   circuitry that rounds the input value to the nearest number of the form $2^J$, where J is an integer;
   circuitry that derives an integer J' from J by, when J is odd, adding '1' to J, and, when J is even, setting J' equal to J, and
   circuitry that calculates $2^{-J'/2}$ as said initial value;
   a multiply-and-shift unit having two inputs and an output;
   an add unit having two inputs, one of said two inputs of said add unit being an output of said multiply-and-shift unit;
   first feedback-selection circuitry that selects, as one input of said multiply-and-shift unit, one of (a) said initial value, and (b) an output of said multiply-and-shift unit; and
   second feedback-selection circuitry that selects, as another input of said multiply-and-shift unit, one of (a) said input value, b) an output of said multiply-and-shift unit, and (c) an output of said add unit.

2. The digital logic circuit of claim 1, wherein:
   said digital logic circuit is operated iteratively; and
   on a first iteration, said first feedback-selection circuitry selects, as said one input of said multiply-and-shift unit, said initial value; and
   on iterations subsequent to said first iteration, said first feedback-selection circuitry selects, as one input of said multiply-and-shift unit, said output of said multiply-and-shift unit.

3. The digital logic circuit of claim 2, wherein:
   on a first sub-iteration of each iteration, said second feedback-selection circuitry selects, as said another input of said multiply-and-shift unit, said input value, and multiplies said another input of said multiply-and-shift unit by said one input of said multiply-and-shift unit;
   on a second sub-iteration of each iteration, said second feedback-selection circuitry selects, as said another input of said multiply-and-shift unit, said output of said multiply-and-shift unit, and multiplies said another input of said multiply-and-shift unit by said one input of said multiply-and-shift unit;
   on a third sub-iteration of each iteration:
   said add unit subtracts said output of said multiply-and-shift unit from '3', and
   said second feedback-selection circuitry selects, as said another input of said multiply-and-shift unit, said output of said add unit, multiplies said another input of said multiply-and-shift unit by said one input of said multiply-and-shift unit to generate a product, and shifts said product to divide said product by '2'.

4. A method of using a digital logic circuit to calculate an estimate of reciprocal square root of an input value, said digital logic circuit including:
- a calculator unit for calculating an initial value from the input value,
- a multiply-and-shift unit having two inputs and an output,
- an add unit having two inputs, one of said two inputs of said add unit being an output of said multiply-and-shift unit,
- first feedback-selection circuitry that selects, as one input of said multiply-and-shift unit, one of (a) said initial value, and (b) an output of said multiply-and-shift unit, and
- second feedback-selection circuitry that selects, as another input of said multiply-and-shift unit, one of (a) said input value, b) an output of said multiply-and-shift unit, and (c) an output of said add unit; said method comprising:
- using said calculator unit to determine said initial value by rounding the input value to the nearest number of the form $2^J$ where J is an integer, deriving an integer J' from J by, when J is odd, adding '1' to J, and, when J is even, setting J' equal to J, and calculating $2^{-J'/2}$ as said initial value.

5. The method of claim 4 further comprising:
operating said digital logic circuit iteratively;
- on a first iteration, operating said first feedback-selection circuitry to select, as said one input of said multiply-and-shift unit, said initial value; and
- on iterations subsequent to said first iteration, operating said first feedback-selection circuitry to select, as one input of said multiply-and-shift unit, said output of said multiply-and-shift unit.

6. The method of claim 5 further comprising:
- on a first sub-iteration of each iteration, operating said second feedback-selection circuitry to select, as said another input of said multiply-and-shift unit, said input value, and to multiply said another input of said multiply-and-shift unit by said one input of said multiply-and-shift unit;
- on a second sub-iteration of each iteration, operating said second feedback-selection circuitry to select, as said another input of said multiply-and-shift unit, said output of said multiply-and-shift unit, and to multiply said another input of said multiply-and-shift unit by said one input of said multiply-and-shift unit;
- on a third sub-iteration of each iteration:
- operating said add unit to subtract said output of said multiply-and-shift unit from '3', and
- operating said second feedback-selection circuitry to select, as said another input of said multiply-and-shift unit, said output of said add unit, to multiply said another input of said multiply-and-shift unit by said one input of said multiply-and-shift unit to generate a product, and to shift said product to divide said product by '2'.

7. The method of claim 6 further comprising stopping iterative operation of said digital logic circuit when, after said second sub-iteration of any iteration, said output of said multiply-and-shift unit is sufficiently close to '1'.

8. The method of claim 7 wherein iterative operation of said digital logic circuit is stopped when, after said second sub-iteration of any iteration, said output of said multiply-and-shift unit is between 0.99 and 1.01.

* * * * *